United States Patent [19]

Diehl

[11] 4,384,730
[45] May 24, 1983

[54] SEAL ASSEMBLY

[75] Inventor: Robert J. Diehl, Wallis, Tex.

[73] Assignee: W-K-M Wellhead Systems, Inc., Shreveport, La.

[21] Appl. No.: 305,578

[22] Filed: Sep. 25, 1981

[51] Int. Cl.³ ................ F16J 15/06; F16L 25/00
[52] U.S. Cl. .................................................. 277/236
[58] Field of Search ............ 277/236; 285/142, 332.4, 285/DIG. 18

[56] References Cited

U.S. PATENT DOCUMENTS

| | | | |
|---|---|---|---|
| 2,046,579 | 7/1936 | Penick et al. | 285/142 |
| 2,397,749 | 4/1946 | Mendelson | 285/332.4 |
| 2,744,651 | 5/1956 | Bredtschneider | 285/DIG. 18 |
| 3,104,121 | 9/1963 | Nordin et al. | 277/236 |
| 3,166,345 | 1/1965 | Pinkard | 277/236 |
| 3,354,462 | 11/1967 | Pierce | 285/142 |
| 3,567,258 | 3/1971 | Scaramucci | 277/236 |
| 4,190,270 | 2/1980 | Vanderford | 285/DIG. 18 |
| 4,299,332 | 11/1981 | Pechacek | 277/236 |

Primary Examiner—Robert I. Smith
Attorney, Agent, or Firm—Marvin J. Marnock

[57] ABSTRACT

A wellhead sealing assembly comprising a metallic sealing ring (10) which is compressed and deformed by tubing hanger load and fluid pressure to establish metal-to-metal sealing contact with the tubing hanger (20) and the tubing head (30). The outer surface of the sealing ring includes an upper cylindrical surface (11) and a lower downward facing frusto-conical surface (16) which coact respectively, with the bore wall of the tubing head (30) and an upward facing frusto-conical shoulder (33) in the tubing head bore (32). It is also provided with an annular end surface (13) which is radially transverse to the ring axis and coacts with a corresponding downward facing shoulder (22) on the tubing hanger (20) which seats thereagainst. The metallic ring (10) also comprises inner annular surfaces in the form of an upward facing frusto-conical surface (15) and a lower cylindrical surface (12) which coacts respectively with a downward facing frusto-conical surface (23) and a cylindrical surface (24) on a reduced diameter section of the tubing hanger. When the tubing hanger is seated on the upper end surface (13) of the sealing ring (10), there is a 5° difference in the angles of taper between the inner frusto-conical surface (15) of the sealing ring (10) and the outer frusto-conical surface (23) of the tubing hanger (20) with the two frusto-conical surfaces contacting only at their upper extremities. When compression loads are applied, the sealing ring is compressed and deformed radially to coact and establish sealing metal-to-metal contact with the bore (32) of the tubing head (30) and the external tapered and cylindrical surfaces (23, 24) of the tubing hanger 20.

3 Claims, 3 Drawing Figures

SEAL ASSEMBLY

BACKGROUND OF THE INVENTION

This invention relates to sealing devices, and more particularly to a seal assembly for effecting a fluid-tight seal between adjacent surfaces of wellhead components such as between a tubing hanger and a tubing head.

With high pressure wellheads where fluid pressures in the order of 20,000 p.s.i. and higher are encountered, conventional sealing devices for preventing well fluids from blowing or leaking at the surface are oftentimes inadequate to the task. At very high pressures, it has been necessary to resort to non-extrudible metal seals which provide for metal-to-metal sealing surfaces. Such sealing devices have been used to seal around pipe hangers in a wellhead and typically utilize the weight of the tubing or casing string and the fluid pressure for compressing the sealing device to effect a seal. While such high pressure metallic seals are well known, as shown in U.S. Pat. Nos. 3,104,121 and 3,166,345, these have only met with limited success. The axial elongation effected by compression of these seals inhibit their sealing effectiveness by reducing the radial forces exerted by these seals with the surfaces with which they must coact.

SUMMARY OF THE INVENTION

The present invention has, as its primary object, the provision of a high pressure sealing assembly which uniquely utilizes the forces imparted by the weight of a tubing hanger load and the fluid pressure in the well to effect a fluid-tight seal. The sealing assembly comprises a metallic sealing ring which is compressed and deformed by the tubing hanger load and the fluid pressure to establish metal-to-metal sealing contact with the tubing hanger and the tubing head. The sealing ring is characterized by an outer surface which comprises an upper circumferential cylindrical surface and a lower downward facing frusto-conical surface which coact respectively, with the bore wall of the tubing head and an upward facing frusto-conical shoulder formed in the tubing head bore. It is also provided with an annular end surface which resides in a radial plane transverse to the axis of the ring and coacts with a corresponding downward facing shoulder on the tubing hanger which seats thereagainst. The metallic sealing ring also comprises a pair of inner annular surfaces in the form of an upward facing frusto-conical surface and an annular cylindrical surface in the lower portion thereof which coact respectively with a downward facing frusto-conical surface and an exterior cylindrical surface on a reduced diameter section of the tubing hanger. The inner frusto-conical surface of the sealing ring is defined by a cone angle which is 10° less than the cone angle defined by the frusto-conical surface on the tubing hanger with which it coacts. Thus, when the tubing hanger is seated on the upper end surface of the sealing ring, there is a 5° difference in the angles of taper between the inner frusto-conical surface of the sealing ring and the outer frusto-conical surface of the tubing hanger, with the two frusto-conical surfaces contacting only at their upper extremities. When compression loads are applied to the sealing ring, it is compressed and deformed radially to coact and establish sealing metal-to-metal contact with the bore of the tubing head and the external tapered and cylindrical surfaces of the tubing hanger.

DETAILED DESCRIPTION OF THE INVENTION

Figure 1:
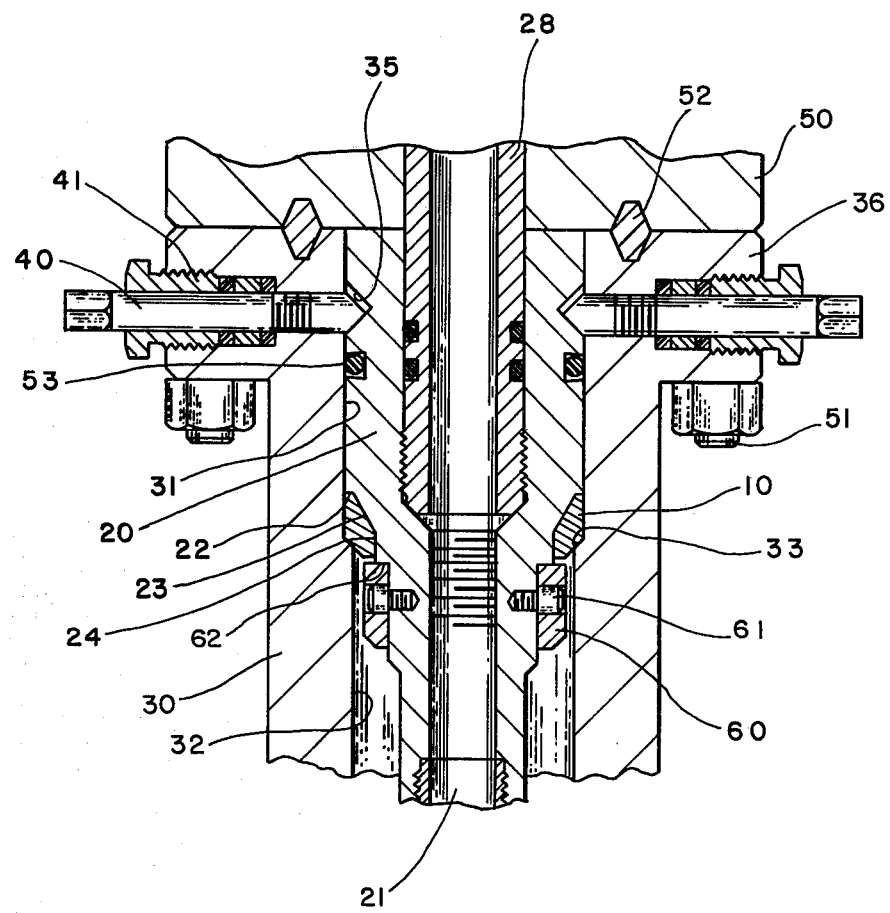
FIG. 1 is a fragmentary sectional view of a tubing hanger suspended in a tubing head with the novel metallic sealing ring of the invention shown in the set loaded condition for effecting a fluid-tight seal therebetween.

Referring to FIG. 1 of the drawing, the sealing assembly of the invention is shown providing a fluid-tight seal between a tubing hanger 20 and a tubing head 20. The tubing hanger 20 supports a string of tubing 21 which is suspended therefrom into the well to receive the fluids produced by the well. In the typical wellhead, the tubing head is supported atop a casing hanger and the tubing extends downwardly and coaxially within the casing supported by the casing hanger.

The tubing head 30 conventionally supports on its upper end surface an assembly of heavy valves and control equipment. In FIG. 1, an adapter flange 50 of such equipment is shown bolted on top of the tubing head 30 by bolts 51 which extend upwardly through a radial flange 36 on the upper end of the tubing head 30. An annular elastomeric seal 52 positioned in corresponding annular grooves in the bottom of the adapter flange 50 and the top of the tubing head flange 36 effect a seal therebetween. In addition, in the particular wellhead arrangement illustrated in FIG. 1, a tubular sleeve 28 is positioned in aligned axial bores of the tubing hanger 20 and the adapter supported thereabove, for the purpose of facilitating seal testing.

The tubing hanger 20 is held down within the tubing head 30 by a plurality of holddown screws 40 which are screwed into threaded openings which extend radially through the tubing head flange 36. Each screw 40 has a conical tip which fits in a tapered annular groove 35 which is formed in the outer surface of the tubing hanger 20. By engagement with the inclined lower surface of the groove 35, the screws 40 hold tubing hanger 20 down against any upward forces that may be exerted thereon. A packing gland 41 is threaded into the flange 36 around the shank of each holddown screw 40 and activates a packing set 42 which is compressed between the gland 41 and a shoulder 43 to form a seal around the screw 40 and thereby seal the opening which accommodates the screw 40.

The central axial bore which extends through the tubing head 30 is comprised of a large diameter section 31 and a smaller diameter section 32. The inner wall of the axial bore between the bore sections 31 and 32 is provided with an annular shoulder 33 in the form of an upwardly facing frusto-conical surface as defined by a cone angle of 90°. The enlarged diameter portion 31 of the tubing head bore above the annular shoulder 33 accommodates the upper end of the tubing hanger 20 which is of such a diameter as to be snugly received in the bore section 31. The tubing hanger 20 is provided on its exterior with a downward facing annular shoulder 22 which resides in a radial plane perpendicular to the longitudinal axis of the tubing hanger 20. The hanger 20 is also provided with an external frusto-conical surface 23 which is defined by a cone angle of 60° and extends convergently downward. The external frusto-conical surface 23 extends from the annular shoulder 22 to the upper terminus of the cylindrical surface 24 provided by a reduced diameter portion of the tubing hanger 20.

The diameter of the enlarged upper end of the tubing hanger 20 is greater than the diameter of the tubing head bore section 32 and the tubing hanger 20 when installed in the well is supported on a novel metallic sealing ring 10 to be hereinafter further described. The sealing ring 10 seats on the annular frusto-conical shoulder 33 of the tubing head 30. In FIG. 1, the metallic sealing ring 10 is shown in the loaded condition wherein it carries the weight of the tubing head and tubing string and is compressed thereby to effect a circumferential fluid-tight metal-to-metal seal between the tubing head 30 and the outer surface of the tubing hanger 20. In addition, an elastomeric annular seal 53 is carried in a groove in the outer surface of the tubing hanger 20 above the radial shoulder 22 for providing additional sealing between the tubing hanger and tubing head.

In the unloaded condition, the sealing ring 10 fits loosely around the tubing hanger 20 adjacent the frusto-conical surface 23 and around the cylindrical surface 24. However, it is retained on the hanger 20 by means of a retainer ring 60 which is secured to the hanger 20 below the frusto-conical surface 23 and the surface 24 by a plurality of bolts 61. The ring 10 is made of slightly malleable metallic material, such as stainless steel, or other metal of similar properties so that the ring can readily withstand fluid pressures up to 20,000 p.s.i. or more and also have a shear strength capable of supporting the weight of a tubing string which can approximate 1,000,000 pounds.

Figure 2:
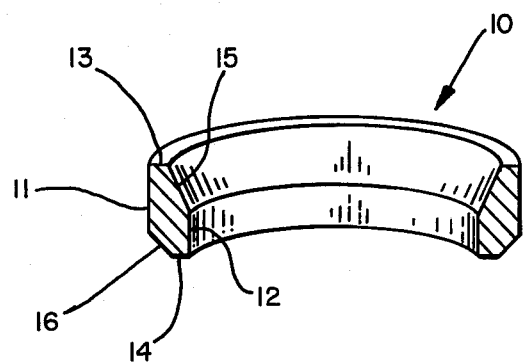
FIG. 2 is an isometric cross sectional view of the unique metallic sealing ring of the invention.
Figure 3:
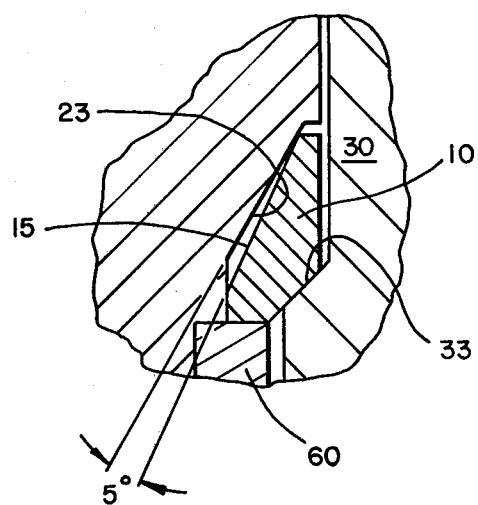
FIG. 3 is an enlarged fragmentary sectional view showing the novel metallic sealing ring of the invention when in the unloaded unset condition.

The sealing ring 10 is shown in FIGS. 2 and 3 in its unloaded, uncompressed state. At its upper and lower ends, the ring is provided with planar end surfaces 13 and 14 which reside in radial planes perpendicular to the central axis of the ring. Intermediate its ends, the external peripheral surface of the sealing ring 10 is comprised of an upper circumferential cylindrical wall 11 and a lower frusto-conical surface 16 which extends from the lower terminus of the cylindrical wall 11 and tapers inwardly to the lower end 14 of the ring. The frusto-conical surface 16 is defined by a cone angle of 90° and is adapted to seat on the correspondingly tapered annular shoulder 33 of the tubing head bore.

The inner wall of the sealing ring 10 is comprised of a lower cylindrical surface 12 and an upward facing frusto-conical surface 15. The cylindrical surface 12 extends from the lower end 14 to the lower terminus of the frusto-conical surface 15 which, in turn, extends from the cylindrical surface 12 to the upper end 13. The frusto-conical surface 15 is defined by a cone angle of 50° such that there is a 5° difference in the taper of the frusto-conical surface 15 of the sealing ring and the frusto-conical surface 23 of the tubing hanger when the ring is in its uncompressed undeformed state as shown in FIG. 3. It is readily apparent from FIG. 3, that when the tubing hanger 20 is seated on the upper end 13 of the sealing ring 10, there is no engagement of the frusto-conical surfaces 15 and 23 other than at their upper annular extremities.

It is thus readily seen that the sealing ring 10 is a six sided polygon in radial cross section with the sides thereof which represent its cylindrical surfaces 11, 12 being disposed in parallel relationship and the sides thereof which represent its end surfaces 13, 14 also being disposed in parallel relationship. The frusto-conical surfaces 15 and 16 of the sealing ring are in coaxial alignment with one another and also with the frusto-conical surface 23 of the tubing hanger 20 and the frusto-conical shoulder 33 of the tubing head 30.

The tubing hanger 20 and tubing head 30 are normally fabricated from very hard carbon steel and the sealing ring 10 is of a selected softer material, such as stainless steel. Accordingly, when the full load of the tubing hanger and tubing string is applied to the sealing ring 10, the ring 10 is compressed and deformed so that a tight metal-to-metal seal is established between the ring 10 and the tubing head 30 and also between the ring 10 and the tubing hanger 20. As shown in FIG. 1, the ring 10 is deformed such that the taper of its frusto-conical surface 15 is altered to conform to the taper of the frusto-conical surface 23 of the tubing hanger and establish a metal-to-metal contact and sealing relationship therewith throughout its areal extent. With respect to the tubing hanger 20, fluid-tight seals are established between the coating surfaces 13 and 22 as well as the coacting surfaces 12 and 24. With respect to the tubing head 30, fluid-tight seals are established between coacting surfaces 16 and 33 and also between the coacting surfaces 11 and 31.

It is to be noted, therefore, that the acute angle between the central axis of the tubing hanger 16 and its frusto-conical surface 23 is less by 5° than the acute angle between the central axis of the ring 10 or hanger 20 and the frusto-conical surface 15 of the ring 10. Accordingly, when the hanger load is applied to the sealing ring 10 with the hanger shoulder 22 seated on the top surface 13 of the ring 10, the 5° angle between the surfaces 23 and 15 is reduced to where the surfaces 23 and 15 conform and are flush against one another. This occurs by deformation of the stainless steel sealing ring 10 such that the cone angle which defines the frusto-conical surface 15 of the ring 10 becomes equal to the cone angle of the frusto-conical surface 23. The deformation of the seal ring 10 therefore results in establishing a very effective fluid-tight seal between the surfaces 23 and 15. The compressive deformation of the ring also results in establishing fluid-tight seals between the tapered surface 16 of the ring and the shoulder 33 as well as sealing relationships between the surfaces 11 and 31 and between the surfaces 12 and 24. Since axial deformation of the ring can only occur in the downward direction, sealing between the surfaces 13 and 22 and all coacting surfaces is enhanced.

It is to be understood that the foregoing description of a preferred embodiment of the invention has been presented for purposes of illustration and description and is not intended to limit the invention to the precise form disclosed. For example, the cone angle which defines the conical surfaces 33 and 16 could be other than 90° and would likely be increased to approximately 120° where unusually long tubing strings and increased tubing loads are employed. The difference in taper between the frusto-conical surfaces 23 and 15, however, should always remain small since only slight variation from a 5° difference could remain effective. Also, while the invention has been illustrated with respect to a tubing head and tubing hanger, it is applicable as well to a casing head and casing hanger. It is to be appreciated, therefore, that such changes may be made by those skilled in the art, without departing from the spirit of the invention.

What is claimed is:

1. In a wellhead sealing assembly, a tubing head having a longitudinal bore extending therethrough, said tubing head bore having an enlarged diameter bore section at the upper end thereof, a lower reduced diameter bore section, and an upward facing annular shoulder joining said enlarged diameter and said reduced diameter bore sections, said upward facing annular shoulder being defined by a frusto-conical surface coaxial with the longitudinal axis of said tubing head;

a tubing hanger mounted within the bore of said tubing head for suspending a tubing string and having a cylindrical bore therethrough for communicating with the tubing string, said tubing hanger having an enlarged upper end portion with an external diameter corresponding to the internal diameter of said upper tubing head bore section so as to be snugly receivable therein, a lower portion of reduced external diameter which is less than the internal diameter of said reduced tubing head bore section, an external downward facing annular shoulder formed at the lower end of said enlarged hanger portion and residing in a plane transverse to the axis of said tubing hanger, and an external frusto-conical tapered surface coaxial with the axis of said tubing hanger and extending in a convergent downward direction from said external annular shoulder to the upper terminus of said reduced diameter hanger portion;

a metallic annular sealing ring mounted in sleeved relationship on said tubing hanger for sealing the annulus between said tubing hanger and said tubing head, said sealing ring having upper and lower annular end surfaces which reside in planes transverse to the axis of the sealing ring, an external peripheral surface comprised of an upper circular cylindrical surface with a diameter corresponding to the internal diameter of the upper bore portion of the tubing head to be snugly receivable therein and a lower frusto-conical surface coaxial with the axis of the sealing ring and convergent downwardly to provide a downward facing external shoulder extending from said upper circular cylindrical surface to said lower annular end surface and defined by a cone angle equal to the cone angle which defines said upward facing annular shoulder in the tubing head bore, and said sealing ring having an internal peripheral surface comprised of a lower circular cylindrical surface extending to said lower annular end surface and an upper frusto-conical surface which is coaxial with the sealing ring and is convergent downwardly to provide an upward facing annular shoulder extending from said upper annular end surface to the upper terminus of said lower circular cylindrical surface, said internal frusto-conical surface of the sealing ring being defined by a cone angle which is slightly less than the cone angle of the external frusto-conical surface of the tubing hanger, and said donward facing shoulder of the tubing hanger adapted to seat on said upper annular end surface of the metallic sealing ring and said external frusto-conical surface of the sealing ring adapted to seat on said upward facing annular shoulder of said tubing head whereby said metallic sealing ring is compressed and deformed when carrying the tubing hanger load to establish a fluid-tight seal between said tubing head and said tubing hanger.

2. A wellhead sealing assembly as set forth in claim 1 wherein the difference in angle of taper between said internal fruso-conical surface of the sealing ring and said external frusto-conical tapered surface of the tubing hanger is approximately 5°.

3. A wellhead sealing assembly as set forth in claim 2 further including a retainer ring mounted in fixed sleeved relationship on said tubing hanger at a position thereon which retains said metallic sealing ring on the tubing hanger in circumferential relationship to said frusto-conical tapered surface of the tubing hanger.

* * * * *